(12) United States Patent  (10) Patent No.: US 8,718,011 B2
Muharemovic et al.  (45) Date of Patent: *May 6, 2014

(54) DOWNLINK SIGNALING OF SOUNDING RESOURCES IN A WIRELESS COMMUNICATIONS SYSTEM

(75) Inventors: Tarik Muharemovic, Dallas, TX (US); Zukang Shen, Richardson, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/331,038

(22) Filed: Dec. 20, 2011

(65) Prior Publication Data

US 2012/0320870 A1  Dec. 20, 2012

Related U.S. Application Data

(62) Division of application No. 12/142,235, filed on Jun. 19, 2008, now Pat. No. 8,102,809.

(60) Provisional application No. 60/944,950, filed on Jun. 19, 2007.

(51) Int. Cl.
*H04W 4/00* (2009.01)
*H04J 1/00* (2006.01)
*H04J 3/00* (2006.01)
*H04J 3/17* (2006.01)
*H04J 3/18* (2006.01)

(52) U.S. Cl.
USPC ........... 370/330; 370/341; 370/343; 370/345; 370/395.4; 370/436; 370/437; 370/438

(58) Field of Classification Search
USPC .............. 370/328–330, 341, 345, 395.4, 436, 370/437, 468
See application file for complete search history.

(56) References Cited

U.S. PATENT DOCUMENTS

2008/0232234 A1* 9/2008 McCoy et al. ................ 370/203

* cited by examiner

*Primary Examiner* — Ronald Abelson
(74) *Attorney, Agent, or Firm* — Ronald O. Neerings; Wade James Brady; Frederick J. Telecky, Jr.

(57) ABSTRACT

This invention is a method for time-sharing sounding resources. A first embodiment defines one common sounding period for all user equipment and all sounding resources. A second embodiment allows for different sounding periods so long as each individual sounding resource uses only one sounding period. A third embodiment offers the most flexibility in sharing of the sounding resources by permitting changes in time. The first option is a special case of the second option. The second option is a special case of the third option.

15 Claims, 3 Drawing Sheets

DOWNLINK SIGNALING OF SOUNDING RESOURCES IN A WIRELESS COMMUNICATIONS SYSTEM

This application is a divisional application of U.S. patent application Ser. No. 12/142,430 filed Jun. 19, 2008.

CLAIM OF PRIORITY

This application is a divisional application of U.S. patent application Ser. No. 12/142,235 filed Jun. 19, 2008, which claims priority under 35 U.S.C. 119(e)(1) to U.S. Provisional Application No. 60/944,950 filed Jun. 19, 2007.

TECHNICAL FIELD OF THE INVENTION

The technical field of this invention is wireless communication.

BACKGROUND OF THE INVENTION

Sounding RS enables time and frequency domain scheduling and has been adopted as a RAN1 working assumption for EUTRA. The channel quality indicator (CQI) estimate obtained from sounding can be expired or stale because of the inevitable time delay between channel sounding and the follow-up scheduled transmission. This is more pronounced for faster user equipment (UE). Thus faster UE needs to have more frequent sounding in order to maintain the fresh CQI at the NodeB. For example a UE with a Doppler of 200 Hz requires a propagation channel for every fifth sub-frame because the sub-frame rate is 1000 Hz. In such case for channel adaptive modulation and coding (AMC) to be performed, the UE must sound nearly every sub-frame or every other sub-frame. The objective of maintaining a fresh CQI at the NodeB may be impossible for very fast UEs having a Doppler of 200 Hz or more because the channel can change substantially between sub-frames. For such fast UEs, a slow rate of infrequent sounding can be performed. Slower UEs naturally ought to sound less frequently. As the UE speed increases, the sounding period should reduce up to a point. Very fast UEs should abandon the goal of maintaining a fresh CQI and sound less frequently.

A simple solution is to configure each cell with a common sounding period for each UE and for each sounding resource. However, any cell may contain UEs with a spread of velocities yielding a spread of Dopplers. Allocating sounding resources to UEs corresponding to the set of UEs velocities would be efficient. This allocation enables efficient utilization of sounding resources. In another proposed allocation, very slow UEs sound only once per several sub-frames and intermediate speed UEs sound once per few sub-frames. This allocation is not straight forward and not always possible. It is mathematically impossible to share a common sounding resource between one UE sounding every 2 sub-frames and a second UE sounding every 3 sub-frames. There is a need in the art to use different sounding periods different cells while tailoring each sounding period to the velocity of a UE or subset of UEs.

SUMMARY OF THE INVENTION

This invention proposes three options for time-sharing sounding resources. The first option defines one common sounding period for all UEs and all sounding resources. This option is the simplest, but offers no flexibility in tailoring the sounding periods to individual velocities of UEs. The second option allows for different sounding periods so long as each individual sounding resource uses only one sounding period. This second option offers more flexibility in allocation of sounding periods across UEs. Finally, the third option offers the most flexibility in sharing of the sounding resources by permitting changes in time. The first option is a special case of the second option. The second option is a special case of the third option.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
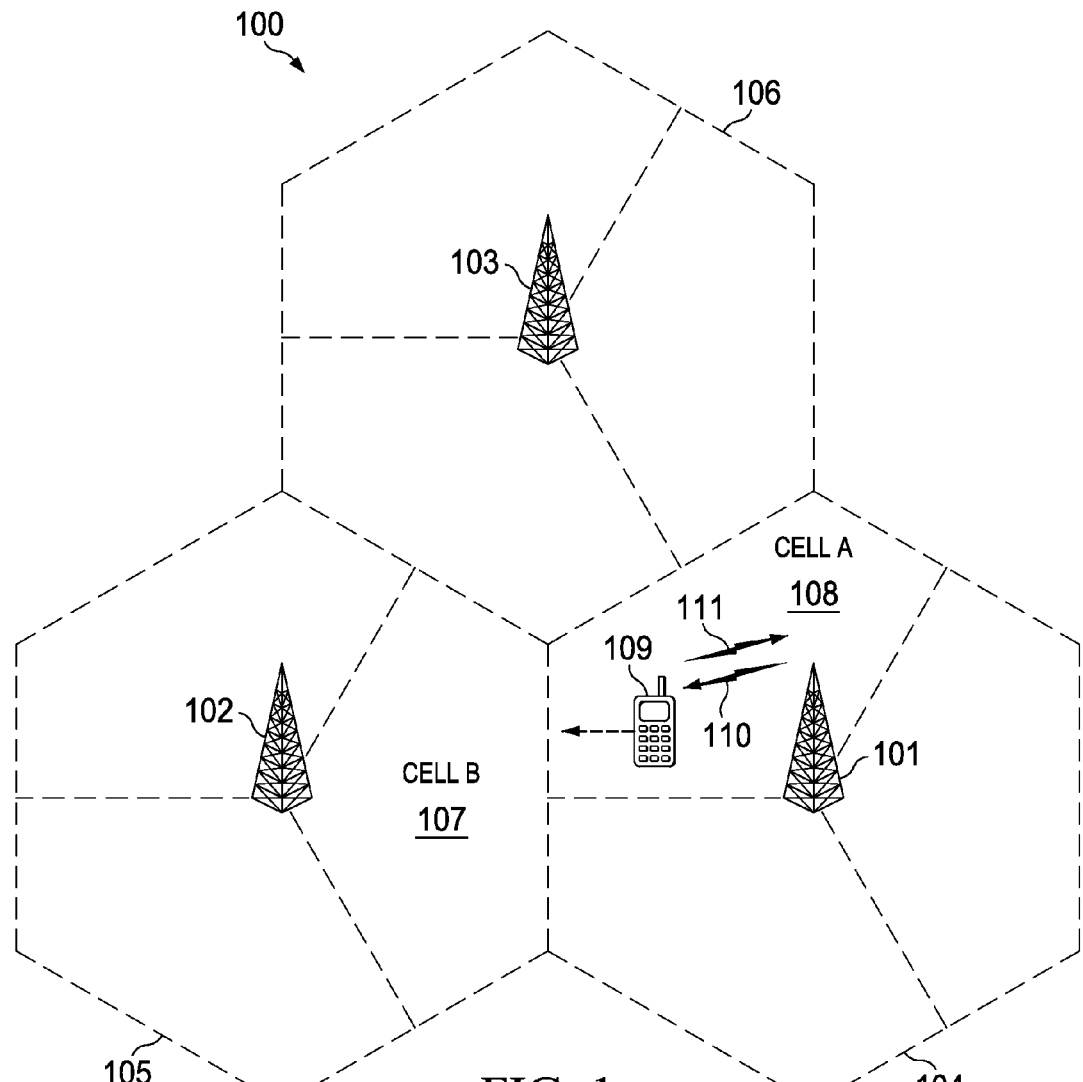
FIG. 1 is a diagram of a communication system of the present invention having three cells.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit data to the UE. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Sounding involves exchange of signals between the base station and the connected user equipment. Each sounding uses a reference resource identifier selected from an available reference resource identifier map h(t, L) and a portion of the spectrum selected from an available spectrum identifier map f(t, N); where L is a group of shared parameters signaled to each UE from the group; and N is a group of shared parameters signaled to each UE from the group. Some examples utilize CAZAC sequences as the reference sequences. CAZAC sequences are complex-valued sequences with: constant amplitude (CA); and) zero cyclic autocorrelation (ZAC). Examples of CAZAC sequences include: Chu sequences, Frank-Zadoff sequences, Zadoff-Chu (ZC) sequences and generalized chirp-like (GCL) sequences. CAZAC (ZC or otherwise) sequences are presently preferred.

Zadoff-Chu (ZC) sequences, as defined by:

$$a_m(k)=\exp\ [j2\pi(m/N)[k(k+1)/2+qK]]\ \text{for N odd},$$

$$a_m(k)=\exp\ [j2\pi(m/n)[k^2/2+qk]]\ \text{for N even}.$$

An alternative convention of the ZC definition replaces j (the complex number $\sqrt{-1}$) in these formulas with $-j$. In the formula: m is the index of the root ZC sequence; N is the length of the sequence, with m and N are relatively prime; q is any fixed integer, for example, q=0 is a good choice because it simplifies computation as qk=0); and k is the index of the sequence element from $\{0, 1, \ldots, N-1\}$. Making N a prime number maximizes the set of root ZC sequences having optimal cross-correlation. When N is prime, there are N−1 possible choices for m and each choice results in a distinct root ZC CAZAC sequence. The terms: Zadoff-Chu, ZC, and ZC CAZAC, are commonly used interchangeably.

The problem of allocating sounding resources is to cover each UE with sounding fast enough to meet their requirements. The maximum sounding period is generally related the UE Doppler, a measure of how fast the UE is moving relative to the base station. We assume that the sounding requirements of the set of UEs are fixed at any point in time but may vary slowly with time. This slow time change enables computing and using repeating patterns for the sounding resource allocation.

A first embodiment of this invention associates only one sounding period to each sounding resource. There can be at most 12 sounding resources for a given contiguous spectrum bandwidth. These are defined for any given orthogonal frequency division multiplexing (OFDM) symbol. This sounding capacity is a fundamental limitation determined by the ratio of the OFDM symbol duration and the channel delay spread. This sounding capacity is the maximum number of sounding resources including code division multiplexing (CDM), frequency division multiplexing (FDM) or hybrid multiplexing. A sounding resource is defined by a sequence index, a specific cyclic shift and a repetition factor (RPF). These may all vary over time to enable hopping. A fixed sounding resource has one set of values sequence index, cyclic shift and RPF at one sub-frame or slot, and optionally another set of values sequence index, cyclic shift and RPF in other time-slots. This sounding resource can be time division multiplexed (TDM) across UEs.

One solution to the problem of tailoring the sounding period to the UE speed is to associate only one sounding period to each sounding resource. Therefore all UEs which are time sharing a common sounding resource have a common sounding period but different offsets. Different sounding resources can have different sounding periods. This permits flexibility in tailoring sounding periods to UEs Doppler spreads. UEs whose Doppler spreads are relatively close can share one sounding resource and one sounding period. Table 1 summarizes an example of this solution.

TABLE 1

| Sounding Resource Index | Sounding Period in sub-frames | UE Doppler in Hz |
|---|---|---|
| 1 | 20 | >200 |
| 2 | 10 | 0-10 |
| 3 | 10 | 0-10 |
| 4 | 10 | 0-10 |
| 5 | 7 | 10-30 |
| 6 | 7 | 10-30 |
| 7 | 7 | 10-30 |
| 8 | 5 | 30-100 |
| 9 | 5 | 30-100 |
| 10 | 5 | 30-100 |
| 11 | 2 | 100-150 |
| 12 | 1 | 150-200 |

Table 1 shows how each sounding resource can use only one sounding period, while different sounding resources can have different sounding periods. Table 1 shows merely one example of sounding resource management. Allocation of resources can be adapted depending on the percentage of fast or slow UEs for efficient utilization of sounding resources.

This solution is not the most efficient because it requires only one sounding period for any sounding resource. This becomes inefficient when it is necessary to multiplex UEs with substantially different Doppler spreads on a common sounding resource. This is inefficient in a cell where all UEs except for one are relatively slow with a Doppler of 0 to 10 Hz. Suppose the fast UE had a Doppler in the range of 100 Hz. In using sounding period in this case, the faster UE should sound once per 5 sub-frames. However, the sounding period per sounding resource limitation would force the slow UEs also to sound once per 5 sub-frames. This is inefficient because slower UEs can sound at a slower rate.

Figure 2:
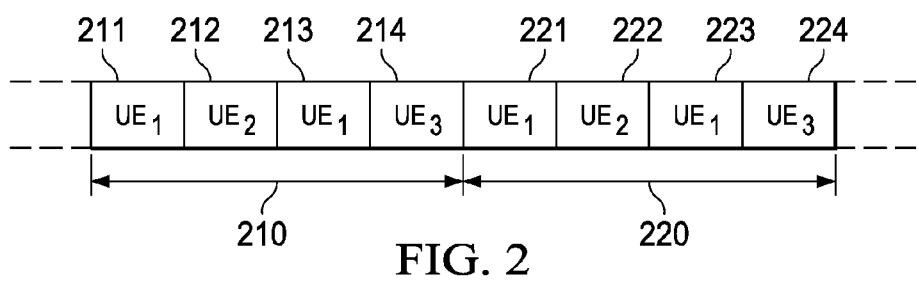
FIG. 2 is a timing diagram of allocation of sounding resources between three UEs.

An alternative solution involves more complex resource management. This alternative allows UEs to time-share a common sounding resource but with disparate sounding periods. This permits more efficient sharing of sounding resources. Consider the example of three UEs time-sharing a common sounding resource across consecutive sub-frames. Assume $UE_1$ has an intermediate speed and $UE_2$ and $UE_3$] have slow speeds. $UE_1$ sounds relatively frequently because its channel varies faster. This could be every other sub-frame. In this example $UE_2$ and $UE_3$ sound every fourth sub-frame. FIG. 2 illustrates the sounding sharing pattern for these three UEs.

Thus $UE_1$ sounds during sub-frames which are either 0 mod 4 (211, 221) or 2 mod 4 (213, 223). $UE_2$ sounds during sub-frames which are 1 mod 4 (212, 222). $UE_3$ sounds during sub-frames which are 3 mod 4 (214, 224). This sounding allocation is efficient because the sounding resource is utilized every sub-frame and the allocation itself can be adapted to UE speeds. For example, if $UE_1$ later slows down, then system can be reconfigured, so that $UE_1$ uses the sounding resource only during 0 mod 4 sub-frames. The position within the repeating period is known as the offset.

To time share a common sounding resource, e assume that sounding for each particular UE is periodic but the period is changeable. Any UE which performs sounding is configured in a periodic deterministic fashion. The sounding period of $UE_i$ is designated s[i]. Note that it is impossible to time share a common sounding resource with periods which are not multiples of each other. It is impossible to configure two UEs where s[1]=2 and s[2]=3. Thus this design requires each distinct sounding period to a multiple of another for a particular sounding resource.

Let $\{M_1, M_2, \ldots, M_N\}$ be any sequence of not necessarily different positive integers. Then, the set of possible sounding periods is defined as follows:

$$\Lambda = \{M_1, M_1M_2, M_1M_2M_3, \ldots, M_1M_2 \ldots M_N\} \quad (1)$$

If any two sounding periods are selected from the set $\Lambda$, one selected sounding period must be an integral multiple of the other or two must be identical. This property enables multiplexing of different sounding periods if they are multiples of each other.

A feasibility condition for time-sharing of any given sounding resource is as follows. Without loss of generality, let $s[1] \leq s[2] \leq \ldots \leq s[K]$ be the set of desired sounding periods, where i-th sounding period $s[i]$ is applies to the i-th UE time-sharing a common sounding resource. A time-sharing allocation for the sounding resource exists only if $s[k]$ belongs to some set $\Lambda$ for some values of $M_1, M_2, \ldots, M_N$, and for every k from $(1, 2, \ldots, K)$ and simultaneously:

$$\frac{1}{s[1]} + \frac{1}{s[2]} + \ldots + \frac{1}{s[K]} \leq 1 \quad (2)$$

Thus in this invention the set of possible sounding periods is $\Lambda$ with the structure defined above. Given this particular set $\Lambda$, for any pair of distinct sounding periods one sounding period is an integral multiple of another. The collection $s[1]$, $s[2], \ldots, s[K]$ is the collection of used sounding periods, where each $s[k]$ belongs to the set $\Lambda$ of possible sounding periods. When and only when the strict equality holds in (2), then the sounding resource is fully utilized throughout all sub-frames. Such was the case with the example of FIG. 2.

A sounding resource sharing tree (SRST) enables design for multiplexing possibly different sounding periods. The root vertex of the SRST is labeled v[0, 1]. This root vertex will have $M_1$ children descended from the root vertex. Children of the root vertex are be labeled $v[0, M_1], v[1, M_1], \ldots, v[M_1-1, M_1]$. Each of these children of the root vertex have $M_2$ children of their own, each of which will have $M_3$ children of their own, until $M_N$.

A SRST tree is defined recursively as follows. The root vertex v[0, 1] has no parent node. The root vertex v[0, 1] has $M_1$ children: $v[0, M_1], v[1, M_1], \ldots, v[M_1-1, M_1]$. A recursive relationship generating remaining vertices of the SRST tree is: any vertex $v[m, M_1M_2 \ldots M_n]$ will have $M_{n+1}$ children $v[m+qM_1M_2 \ldots M_n, M_1M_2 \ldots M_nM_{n+1}]$: where $q=\{0, 1, 2, \ldots, M_{n+1}-1\}$.

Figure 3:
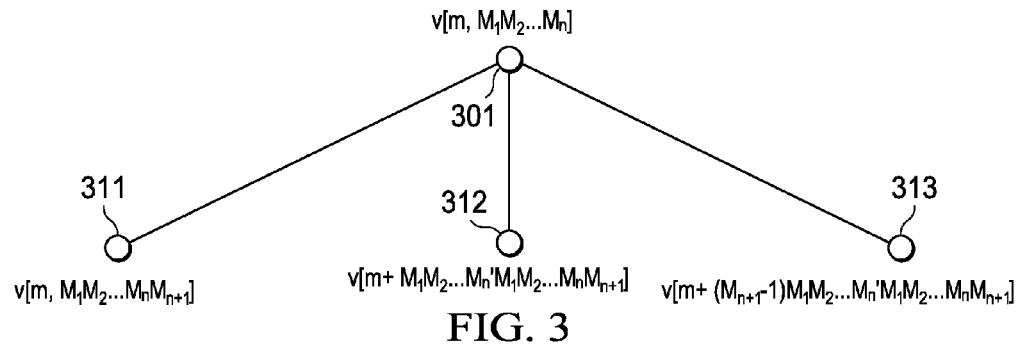
FIG. 3 illustrates the recursive relationship of a generalized sounding resource sharing tree (SRST)

FIG. 3 illustrates this recursive relationship. FIG. 3 shows root vertex $v[m, M_1M_2 \ldots M_n]$ 301 and children vertices $v[m, M_1M_2 \ldots M_nM_{n+1}]$ 311, $v[m+M_1M_2 \ldots M_n, M_1M_2 \ldots M_nM_{n+1}]$ 312 and $v[m+(M_{n+1}-1)M_1M_2 \ldots M_n, M_1M_2 \ldots M_nM_{n+1}]$ 313. For any vertex v[i,j], j represents the number of nodes at that level and i represents the offset of that node. For any level the set of offsets i is equal in number to the number of nodes at that level j.

Figure 4:
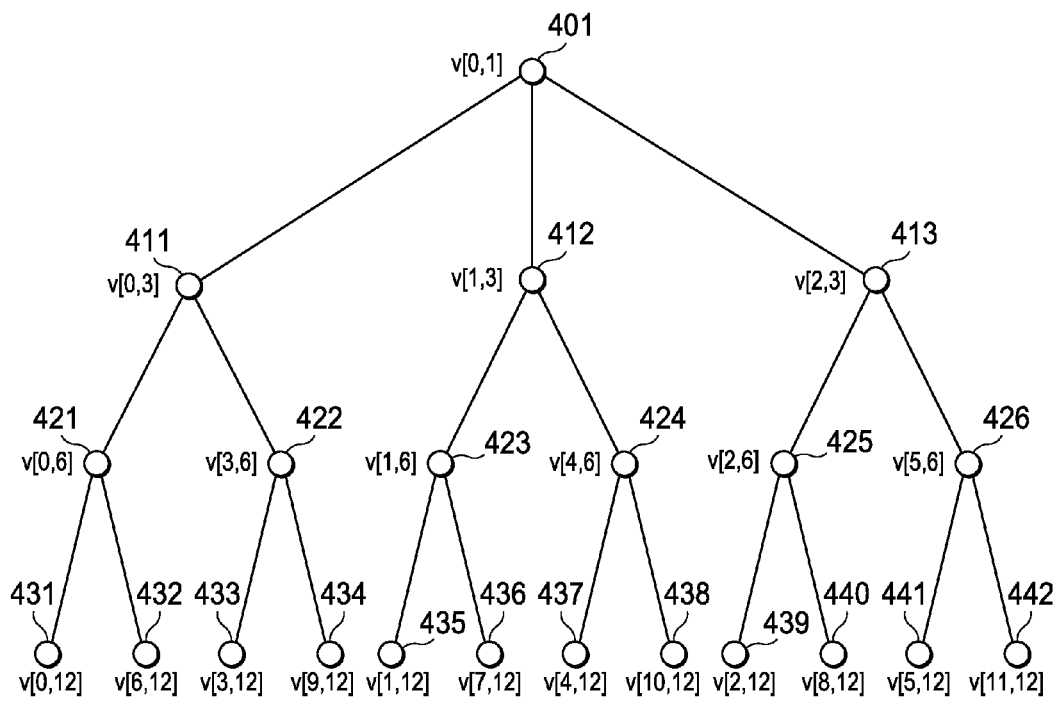
FIG. 4 illustrates an example sounding resource sharing tree (SRST)

FIG. 4 illustrates an example SRST tree. FIG. 4 illustrates: root vertex v[0, 1] 401; children vertices v[0, 3] 411, v[1, 3] 412 and v[2, 3] 413; grandchildren vertices v[0, 6] 421, v[3, 6] 422, v[1, 6] 423, v[4, 6] 424, v[2, 6] 425 and v[5, 6] 426; and great grandchildren vertices v[0, 12] 431, v[6, 12] 432, v[3, 12] 433, v[9, 12] 434, v[1, 12] 435, v[7, 12] 436, v[4, 12] 437, v[10, 12] 438, v[2, 12] 439, v[8, 12] 440, v[5, 12] 441 and v[11, 12] 442. The root node v[0, 1] has three children. Each of these children has two children making six grandchild nodes. Each of these grandchildren have two children making 12 great grandchildren. The number of nodes at the bottom level is determined by the relation between the shortest sounding period to the longest sounding period.

Vertices of the SRST tree are interpreted as follows: each vertex $v[m, M_1M_2 \ldots M_n]$ represents a potential sounding transmission, which is defined by the sounding period $M_1M_2 \ldots M_n$ and by the relative offset m with respect to a common reference sub-frame. Each child vertex labeled as $v[m+qM_1M_2 \ldots M_n, M_1M_2 \ldots M_nM_{n+1}]$ for some q, only occupies a subset of sounding sub-frames from its parent vertex $v[m, M_1M_2 \ldots M_n]$. If a particular vertex $v[m, M_1M_2 \ldots M_n]$ is used in the final allocation of sounding sub-frames, then no descendants of that vertex can be re-used in the final allocation for other UEs.

A valid sharing configuration is any set X of vertices on the SRST in which no vertex from X descends from another vertex from X. Each vertex $v[m, M_1M_2 \ldots M_n]$ from X is allocated to a distinct UE. Thus that UE sounds with a period $M_1M_2 \ldots M_n$ and with a relative offset m. The thus determined any valid sharing configuration X solves the problem of time-multiplexing UEs with different sounding periods on a common sounding resource. Allocating each vertex from X to a different UE satisfies two desired goals. Each UE transmitter uses periodic sounding. Different UEs share the sounding resource across distinct sub-frames.

Figure 5:
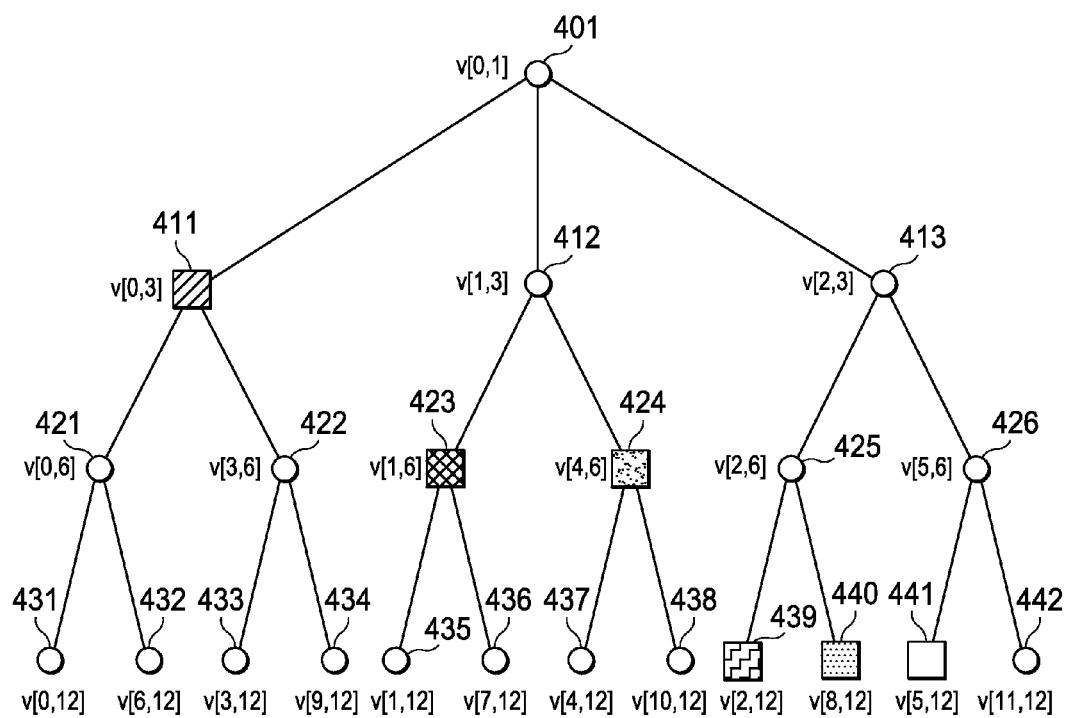
FIG. 5 illustrates an under utilized allocation of the sounding resource sharing tree (SRST) illustrated in FIG. 4.

FIG. 5 illustrates an under-utilized example of a valid sharing configuration for $M_1=3$, $M_2=2$, $M_3=2$. In FIG. 5 the vertices 411, 423, 424, 439, 440 and 441 are allocated and used by the system. Allocation of vertex 411 prevents allocation of children vertices 421 and 422 and grandchildren vertices 431, 432, 433 and 434. Allocation of vertex 423 prevents allocation of children vertices 435 and 436. Allocation of vertex 424 prevents allocation of children vertices 437 and 438. In the example of FIG. 5 vertex v[11,12] 442 is not allocated.

Specifying period and offset of a particular sounding transmission for a UE specifies a vertex from the resource tree. A valid sharing configuration is a set of vertices with the above stated properties. Listing 1 is a greedy algorithm which is guaranteed to converge. This algorithm assumes $s[1] \leq s[2] \leq \ldots \leq s[K]$. This assumption can be made without loss of generality.

Listing 1

```
Initialization: All vertices are available
for k = 1 to K do
    find an available vertex v[m, s[k]] from the list of
        available vertices
    put v[m, s[k]] into X
    remove v[m, s[k]] and all its descendents from the list
        of available vertices
end
```

During each pass corresponding to a value of k, this greedy algorithm selects an available vertex v[m, s[k]], from the list of available vertices. The exact nature of this selection is an implementation detail. The algorithm then eliminates the selected vertex from the available list. Then the algorithm repeats for the next value of k.

Other algorithms are clearly possible. Using basic combinatorial principles, the number of different available choices for a valid sharing configuration is given as follows:

$$L = \prod_{k=1}^{K} \left[ s[k] + 1 - \sum_{n=1}^{k} \frac{s[k]}{s[n]} \right] \quad (3)$$

The first term in the product is s[1]. The second term is s[2]−s[2]/s[1]. The third term is s[3]−s[3]/s[1]−s[3]/s[2]. Accordingly a valid sharing configuration is not unique. A number of possible solutions exist. In the preferred embodiment the set of periods s[k] includes the most used periods of 2 ms, 5 ms, 10 ms, 20 ms, 40 ms, 80 ms, 160 ms and 320 ms.

This invention proposes three options for time-sharing sounding resources. The first option defines one common sounding period for all UEs and all sounding resources. This option is the simplest, but offers no flexibility in tailoring the sounding periods to individual velocities of UEs. The second option allows for different sounding periods so long as each individual sounding resource uses only one sounding period. This second option offers more flexibility in allocation of sounding periods across UEs. Finally, the third option offers the most flexibility in sharing of the sounding resources by permitting changes in time. The first option is a special case of the second option. The second option is a special case of the third option.

What is claimed is:

1. A wireless communication system time-sharing a sounding reference signal resource between a plurality of mobile user equipments, comprising:
    a base station operable to
        signal a sounding reference signal resource identifier to a first user equipment,
        signal the sounding reference signal resource identifier to a second user equipment,
        signal a first sounding reference signal periodicity to the first user equipment,
        signal a first sounding reference signal offset to the first user equipment,
        signal a second sounding reference signal offset to the second user equipment different than the first sounding signal offset, and
        signal a second sounding reference signal periodicity to the second user equipment, the second sounding reference signal periodicity is an integral multiple of the first sounding reference signal periodicity measured with respect to a time reference shared between user equipments in the group of user equipments.

2. The wireless communication system of claim 1, wherein:
    said base station is further operable to signal the first sounding reference signal periodicity to the first user equipment and signal the second sounding reference signal periodicity to the second user equipment each select a periodicity from the set consisting of 2 ms, 5 ms, 10 ms, 20 ms, 40 ms, 80 ms, 160 ms and 320 ms.

3. The wireless communication system of claim 1, wherein:
    said base station is further operable to signal said sounding reference signal resource identifier by signaling a group of parameters group N by selecting a reference sequence from a reference sequence identifier map h(t, N), where t is a common time identifier and N is a group of shared parameters.

4. The wireless communication system of claim 3, wherein:
    said reference sequence identifier map h(t, N) identifies a modified Zadoff-Chu (ZC) sequence.

5. The wireless communication system of claim 3, wherein:
    said base station is further operable to signal a sounding reference signal identifier by signaling a group of parameters group L by selecting a spectrum resource from a spectrum identifier map f(t, N), where t is a common time identifier and N is a group of shared parameters.

6. The wireless communication system of claim 5, wherein:
    said spectrum identifier map f(t, L) maps to a fixed spectrum.

7. A wireless communication system for allocation of an offset and a periodicity associated with a sounding reference signal resource identifier to a plurality of user equipment comprising:
    a base station operable to
        signal an offset y from a set X to a user equipment, where X is a finite set of available offsets associated with said sounding reference signal resource,
        signal a periodicity s to the user equipment, and
        update the set X by removing a group of at least one offset from the set X, each offset of the group having the form y+k*s where k is an integer.

8. The wireless communication system of claim 7, wherein:
    y is the smallest offset in the set X.

9. The wireless communication system of claim 7, wherein:
    y is the largest offset in the set X.

10. The wireless communication system of claim 7, wherein:
    y is the earliest available offset in the set X.

11. A wireless communication system for de-allocation of an offset associated with an sounding reference signal resource; comprising:
    a base station operable to update a set X by inserting a group of at least one offset into the set X, each offset of the group having the form y+k*s, where: X is a set of available offsets associated with the sounding reference signal resource identifier; y is the sounding reference signal offset previously allocated to a user equipment; s is the periodicity previously allocated to the user equipment; and k is an integer.

12. The wireless communication system of claim 11, wherein:
    said base station is further operable to
        maintain a set of allocated periodicities s(K) for each sounding reference signal resource, and
        allocate the sounding reference signal resource to additional user equipment with s(N+1) only if the sum of reciprocals of s(K) is less than or equal to 1.

13. The wireless communication system of claim 11, wherein:
    s is selected from a set consisting of least two numbers; and for any pair of numbers in the set s(K) the larger number is an integral multiple of the smaller one.

14. The wireless communication system of claim 11, wherein:
    the set s(K) is 5 ms, 10 ms, 20 ms, 40 ms, 80 ms, 160 ms and 320 ms.

15. The wireless communication system of claim 11, wherein:
    the set s(K) is 2 ms, 10 ms, 20 ms, 40 ms, 80 ms, 160 ms and 320 ms.

* * * * *